US 6,592,033 B2

(12) United States Patent
Jennings et al.

(10) Patent No.: US 6,592,033 B2
(45) Date of Patent: Jul. 15, 2003

(54) ITEM RECOGNITION METHOD AND APPARATUS

(75) Inventors: Andrew John Jennings, Melbourne (AU); Brett Eastwood, Oakleigh (AU); John Gerard Waldron, Vermont South (AU)

(73) Assignee: Ajax Cooke Pty Ltd, Braeside (AU)

( * ) Notice: Subject to any disclaimer, the term of this patent is extended or adjusted under 35 U.S.C. 154(b) by 0 days.

(21) Appl. No.: 10/071,246

(22) Filed: Feb. 11, 2002

(65) Prior Publication Data

US 2002/0138374 A1 Sep. 26, 2002

Related U.S. Application Data

(63) Continuation of application No. PCT/AU00/00954, filed on Aug. 10, 2000.

(30) Foreign Application Priority Data

Aug. 10, 1999 (AU) .............................................. PQ2124

(51) Int. Cl.[7] .............................................. G06F 17/60
(52) U.S. Cl. ...................................... 235/385; 235/378
(58) Field of Search ................................ 235/385, 378; 705/16; 364/403

(56) References Cited

U.S. PATENT DOCUMENTS 5,497,314 A * 3/1996 Novak .......................... 705/17
5,546,475 A * 8/1996 Bolle et al. ................. 382/190
5,969,317 A * 10/1999 Espy et al. .................. 235/378
6,061,666 A * 5/2000 Do et al. ..................... 235/379
6,238,342 B1 * 5/2001 Feleppa et al. ............. 600/437

FOREIGN PATENT DOCUMENTS

EP          0 843 293 A2       5/1998

* cited by examiner

Primary Examiner—Michael G. Lee
Assistant Examiner—Lisa M. Caputo
(74) Attorney, Agent, or Firm—Larson & Taylor, PLC

(57) ABSTRACT

A method is provided for recognizing an individual item at an identification station from a variety of known products for purposes of entry into an inventory and/or register system. A backlit viewplate is used and a digital image capturing device captures and stores a reference image of the viewplate. A backlit image of the item to be identified adjacent the viewplate is then captured and converted into a digitized image signal representing the captured image. The digitized image signal is processed by subtraction of a representation of said stored reference image to remove viewplate artifact, to provide a background-compensated image signal. The background-compensated image signal is analyzed to generate image descriptors characterizing features of size and/or shape of the item, and the descriptors are compared with the data stored on a computerized product database to identify data sets with the highest correlation. Visual representations of products corresponding to the data sets with the highest correlation are displayed; and an operator confirms the recognition result for entry into the inventory and/or register system.

21 Claims, 5 Drawing Sheets

ITEM RECOGNITION METHOD AND APPARATUS

RELATED APPLICATIONS

This application is a continuation of international application number PCT/AU00/00954, filed Aug. 10, 2000.

BACKGROUND OF THE INVENTION

1. Field of the Invention

The present invention relates to a method and apparatus for item recognition and, more specifically, to the automatic recognition of items at a "point of sale" (POS) in a retail outlet, such as at a hardware store checkout.

2. Description of the Related Art

In all retail environments the various items of purchase need to be identified for entry into a computerised inventory and register system. This is very often done by applying a UPC (or similar) barcode to the item and then using the scanner at the POS to scan the barcode in order to produce a unique data entry for passing to the computerised system. This system is popular and effective and used now in all types of retail outlets. However, in the case of some items this approach is simply unrealistic, as applying a bar code to the item can be impractical. For example, in a hardware store a shopper may be purchasing small, loose items such as nuts, bolts and other fasteners. It may not be cost-effective or it may not be possible or convenient to reliably apply a bar code to such items, and the present approach to addressing this problem is to leave the job of item identification to the checkout operators, each checkout being provided with a manual look-up directory whose pages display images of each item sorted by category and presented alongside an individual barcode. The operator will look up the item image in the relevant category and, once it has been identified, will simply scan the accompanying barcode to enter the item into the computerised system. Whilst this system is generally fairly reliable it is naturally time-consuming and inefficient, and relies on an accurate categorisation of the various items and continuous updates to the manual directories. Thought has been given to computerising this procedure, and displaying the directory on a screen for enquiry by the checkout operator, but this approach does little to relieve the basic inefficiency of such an identification procedure at the POS.

Previous attempts have been made at providing a POS checkout system which automates item identification. In U.S. Pat. No. 5,497,314, for an "Automated Apparatus and Method for Object Recognition at Checkout Counters", an unmanned checkout station is disclosed to which the items to be processed are conveyed by any appropriate means, the items being placed on the conveyor by the customer and automatically conveyed into an enclosed housing containing an illumination source, weight differentiation means and video imaging equipment. Sensors are used to control the operation of the automatic conveyor, and digital image processing techniques are then used to identify the items by taking a digitised image of the object at a known focal point and illumination, and correlating it by way of "template matching" to the set of digitised images contained within the database of the system.

The system of U.S. Pat. No. 5,497,314 uses 3-D images with controlled overhead lighting, and requires a housing to minimise the effect of extraneous light sources. Since the items to be identified are moving on a conveyor belt, the system also requires either a camera lens with auto-focus capability or a location sensor to determine the position of the various items on the belt, to ensure they are in the focal plane of the camera lens when the digitised image is captured. Whilst sophisticated in its complexity the system disclosed is inherently slow and cumbersome and its cost likely to be too high to be competitive in most retail markets.

SUMMARY OF THE INVENTION

The present invention aims to address the drawbacks of the prior art, and to that end there is provided a method for recognising an individual item at an identification station from a variety of known products for purposes of entry into an inventory and/or register system, said method comprising the steps of;

providing a viewplate at said identification station;

illuminating said viewplate from the backside to provide a backlit image viewable from the front side of the viewplate;

providing a digital image capturing means positioned relative to the viewplate to capture said backlit image;

capturing and storing a reference image of said viewplate;

supporting the item to be identified adjacent the viewplate;

viewing said item with said digital image capturing means to capture said backlit image;

providing a digitised image signal representing said captured image;

processing said digitised image signal by subtraction of a representation of said stored reference image to remove viewplate artifact, to provide a background-compensated image signal;

image-analysing said background-compensated image signal to generate at least one image descriptor characterising features of size and/or shape of the item to be identified;

providing a computerised product database for storage of data sets representing image descriptors characterising features of size and/or shape for all of said variety of known products;

comparing said at least one item image descriptor with the data stored on said computerised product database to identify data sets with the highest correlation;

displaying a recognition result, being a visual representation of at least one product corresponding to the data sets with the highest correlation; and providing means for selective verification whereby an operator can confirm the recognition result for entry into the inventory and/or register system.

In a preferred form, the viewplate is arranged for supporting the item to be identified, the backside of the viewplate then being the underside, and the digital image capturing means being arranged above the viewplate to capture the backlit image.

Preferably, said digital image capturing means is a black-and-white digital camera and said digitised image signal is a grey-scale image signal. For an additional level of item discrimination, the digital image capturing means may comprise a colour camera.

In one form of the invention, said identification station is a checkout counter in a retail goods outlet, provided with a display screen for displaying said recognition result.

In a preferred form, said viewplate is associated with a weight data means capturing weight data of said item to be identified, and said weight data is also used in said computerised product database and said comparison step to produce the recognition result.

Preferably, said digitised image signal or said background compensated image signal is subjected to a binary threshold step, and additionally or alternatively said background compensated image signal is subjected to a filtering step to reduce or remove noise and/or errors.

Said image analysing step may include an object segmentation step which serves to isolate a segmented image of an individual item from any other parts of the image. The object segmentation step may involve a selection based on prescribed criteria of size, shape and/or position to select a segmented image of an individual item from other segmented images.

In a preferred embodiment, said generation of said at least one image descriptor involves calculating a representation of at least one parameter of said background-compensated image signal selected from the group of width, length, area, occupation ratio, circularity, perimeter, eccentricity, hole number, hole size, boundary feature, radial diameters signature, minimum radial diameters, maximum radial diameters, mean of radial diameters, standard deviation of radial diameters, radial radii signature, minimum radial radii, maximum radial radii, mean of radial radii, standard deviation of radial radii, first Hu moment, second Hu moment, third Hu moment, fourth Hu moment, fifth Hu moment, sixth Hu moment and seventh Hu moment.

Preferably, said comparison step involves a pattern recognition algorithm, such as a K-Nearest Neighbour technique.

Said recognition result may be a candidate list of a number of said products with the data sets having the highest ranking correlation.

The visual representation may be an image of a product or products stored on the computerised product database, and both the displaying step and the step of selective verification are preferably carried out at the identification station. The display step may include the display of a barcode on said screen for selective scanning by the operator. Alternatively, the display step may involve display on a touchscreen for product selection by the operator.

Preferably, said capturing and storing of the reference image is repeated at intervals.

In another aspect, the invention provides an item recognition apparatus for recognising an individual item from a variety of known products for purposes of entry into an inventory and/or register system, said apparatus comprising:

an identification station having:
a viewplate with backside illumination to provide a backlit image viewable from the frontside of the viewplate;
a digital image capture means arranged to view said backlit image;
a display screen for viewing by an operator; and
an entry means for the operator to selectively make entries into the inventory and/or register system;

computer storage and processing means having:
a first memory store containing data representing a reference image of said viewplate;
a second memory store containing a product database of data sets representing image descriptors characterising features of size and/or shape for all of said variety of known products; and
digitised image processing and analysing means for processing and analysing a digitised image captured by said digital image capture means, including:
means for using the data in said first memory store to subtract the representation of said reference image;
means for generating at least one image descriptor characterising features of size and/or shape of the item to be identified; and
means for comparing said at least one image descriptor with said stored data in said second memory store to identify stored data sets with the highest correlation and to produce a recognition result;
and means for communicating said recognition result to said display screen.

In a preferred form, said entry means is provided by a touchscreen. In an alternative form, the entry means may be a barcode scanner.

The apparatus may include a plurality of identification stations, the computer storage and processing means having a first memory store associated with each identification station and a central second memory store for communication with each of the plurality of identification stations.

Said identification station may include a weighscale associated with said viewplate, said product database including data characterising the weight of all of said variety of known products, and said comparison means including means to compare weight data from an item with stored weight data in the product database.

The invention also provides a checkout station in a retail goods outlet incorporating the above-defined item recognition apparatus.

Also within the contemplation of the invention is a system including the above-defined item recognition apparatus in combination with an inventory and/or register system.

BRIEF DESCRIPTION OF THE DRAWINGS

To more clearly illustrate the invention, an exemplification will now be described with reference to the accompanying drawings, in which.

DESCRIPTION OF THE PREFERRED EMBODIMENTS

Figure 1:
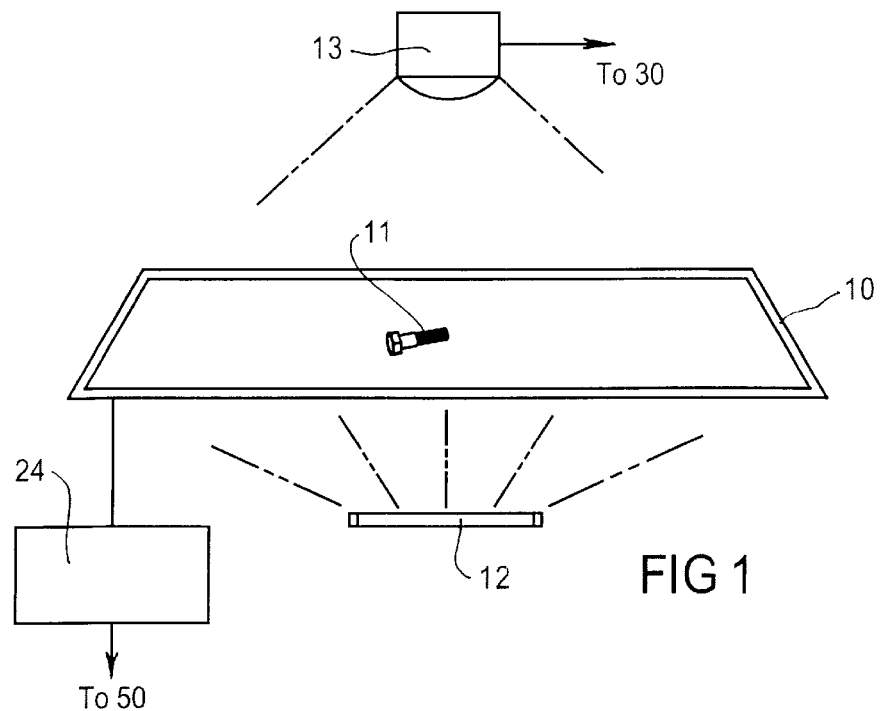
FIG. 1 shows a schematic representation of an item recognition viewplate at a POS checkout station, on which a typical item is placed.

At the POS checkout station a planar viewplate 10 is horizontally arranged, upon which viewplate a checkout operator (or customer) places an item to be recognised 11, such as a bolt. Viewplate 10 is moulded with a shallow raised edge to stop items from rolling off and is formed from white acrylic sheet or some other suitable light-diffusing material. Viewplate 10 is illuminated from below by one or more fluorescent tubes 12 (although any other suitable light source may be used), to provide backlit illumination rendering a shadow or silhouette image to a viewer above viewplate 10. A black-and-white digital imaging camera 13 with a resolution of 800×600 pixels is mounted approximately 60 cm above viewplate 10 and focussed thereon, to capture a 2-D image when item 11 is placed on the viewplate, and thus within the focal plane of camera 13. An IR filter together with a UV filter is applied over the lens of camera to reduce the effect of external lighting on the system. It should be noted that viewplate may be incorporated in a wide variety of checkouts or other locations in retail outlets, or at different points in a warehouse or distribution station.

Figure 2:
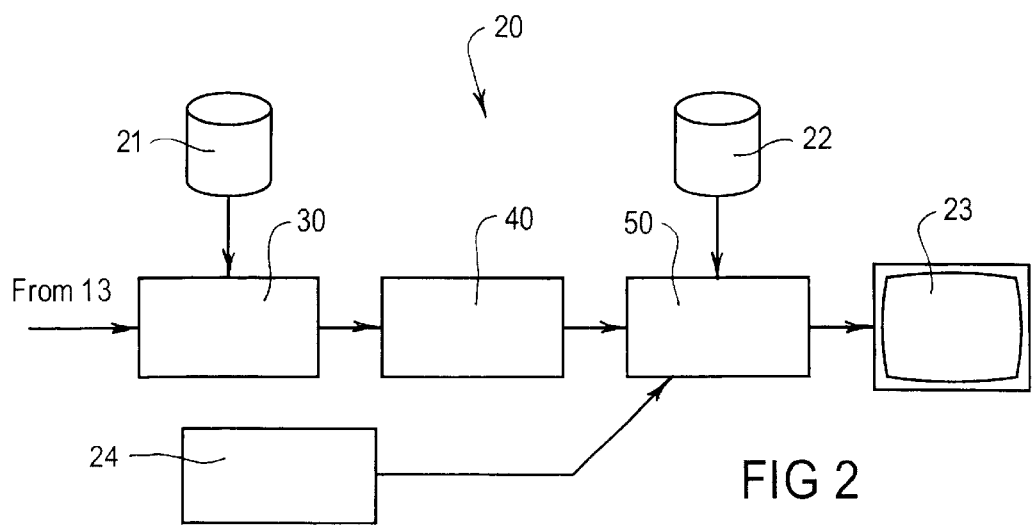
FIG. 2 is a block diagram illustrating an overview of the software system performing the recognition function.

Camera 13 is connected to a software system 20 performing the item recognition function, which comprises three main stages; image processing 30; image analysis 40; and recognition 50. The other components illustrated in FIG. 2 are a background image store 21 and a parts database 22, the purpose and operation of both components being explained in greater detail below. The output of the recognition system is passed to a checkout display 23. Additionally a signal from weight data means 24, such as a scale associated with viewplate 10, may be provided to the recognition system for additional discrimination information.

Figure 3:
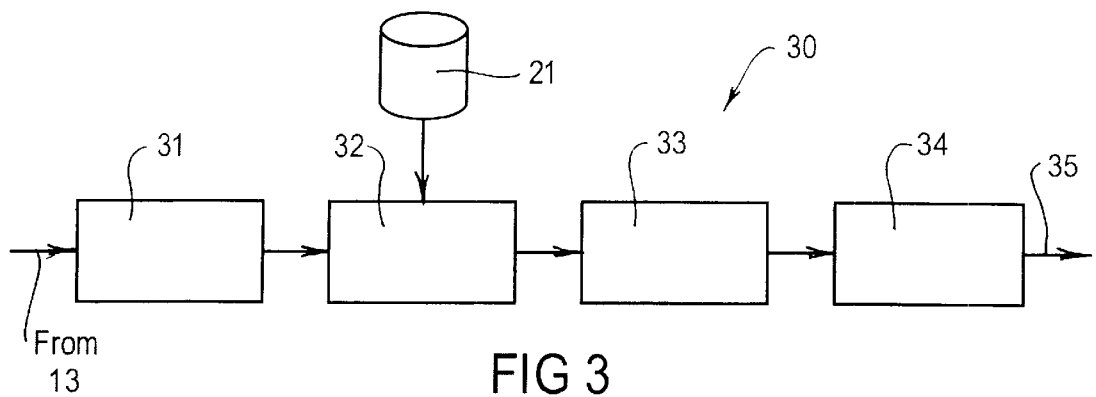
FIG. 3 is a block diagram illustrating the image processing stage of the system.

Image Processing Stage 30 (FIG. 3)

At image capture step 31 the 2D shadow image captured as a digital representation is first converted (if necessary) to a form suitable for processing as a grey-scale image. The next step is background removal 32, in which the system compensates for image artefact or noise due to scratches or other marks present on viewplate 10. For this calibration, black-and-white camera 13 regularly captures a reference image when no items are present for calibration, and thereby continually updates a background image store 21. Background removal step 32 subtracts the reference image from the grey-scale image to remove the background artefact from the image. The resultant data then passes through a binary threshold step 33, which operates to convert the grey-scale image to a binary image wherein each pixel is associated with a "1" or a "0", depending on whether the item was or was not present in the object area corresponding to that pixel. The final step in image processing stage 30 is image filtering 34 in order to remove noise and errors associated with the background removal and binary threshold operations. This image filtering step involves a standard smoothing operation "opening" or "closing" image pixels according to an algorithm which takes into account the status of neighbouring pixels. Such image processing methods are well known to the skilled reader and will not be further described here. The output from this step 34 is a filtered binary image 35.

Figure 4:
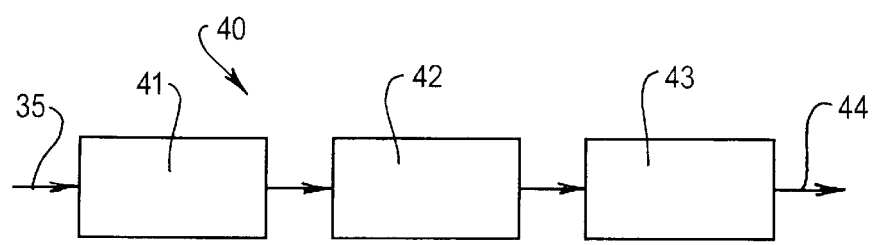
FIG. 4 is a block diagram illustrating the analysis stage of the system.

Analysis Stage 40 (FIG. 4)

The aim of this stage is to determine characteristic feature information from the binary image 35 outputted from image processing stage 30. The first step here is object segmentation 41, enabling the system to handle more than a single item at once. This involves isolating the image associated with each item 11 from the rest of the image using a so-called 'region-growing' algorithm, and labelling that segmented image. Object segmentation of image data is well known to the skilled reader and will not be further described here. The next step is object selection 42, in which the system makes a selection from the segmented images of the most likely one required for recognition based on size, shape and position criteria. The selected object is then analysed at object analysis step 43 and a large number of topological and structural features are generated, these features becoming the basis of a descriptive feature vector 44 that is used to uniquely identify each product.

The features generated include, but are not limited to, those appearing in Table 1.

TABLE 1

Descriptors

| Image Feature | Comment |
| --- | --- |
| Width | |
| Length | perpendicular to width |
| Area | a summation of the number of "1" pixels |
| Occupation Ratio | within a rectangular bounding box |
| Circularity | |
| Perimeter | a summation of the edge pixels of the image |
| Eccentricity | |
| Number of "Holes" | a standard washer, say, would have one "hole" |
| Size of "Holes" | |
| Boundary description features | based on encoding vectors generated around the edge of the image |
| Radial diameters signature | the radial diameters at regular angular spacings |
| Minimum Radial diameters | all meeting at the centre of gravity of the image |
| Maximum Radial diameters | |
| Mean of Radial diameters | |
| Standard deviation of Radial diameters | |
| Radial radii signature | similar to the radial diameter features, but producing distinction for non-symmetrical items |
| Minimum Radial radii | |
| Maximum Radial radii | |
| Mean of Radial radii | |
| Standard deviation of Radial radii | |
| First Hu Moment | Standard area moments |
| Second Hu Moment | |
| Third Hu Moment | |
| Fourth Hu Moment | |
| Fifth Hu Moment | |
| Sixth Hu Moment | |
| Seventh Hu Moment | |

Feature vector 44 represents a weighted combination of these descriptors, the weighting being selected according to the particular application. It is to be noted that all these features are orientation-neutral, and it is therefore not necessary for the image processing to attempt to rotate the image before analysis step 43.

Figure 5:
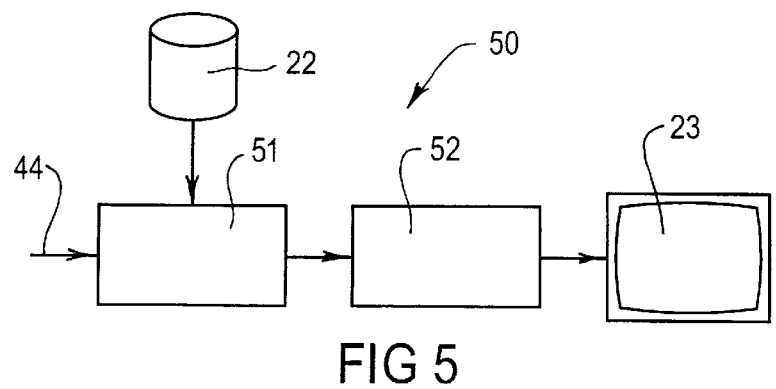
FIG. 5 is a block diagram illustrating the recognition stage of the system.

Item Recognition Stage 50 (FIG. 5)

The next stage utilises a combination of artificial intelligence and machine learning in a recognition step 51, in order to determine the most likely product matches based on descriptive feature vector 44, by correlation with the product data stored on parts database 22. The recognition step involves a pattern recognition technique, and the preferred technique is the K-Nearest Neighbour algorithm, since it is relatively fast to train. The K-Nearest Neighbour algorithm per se is well known to the skilled reader and will not be further described here. Other approaches which may be more appropriate in particular applications are statistical techniques (Euclidean and other distance measures), combinations of Neural network and Fuzzy classification techniques, and search tree pruning techniques. These approaches are generally known in the field of pattern recognition, and the actual technique selected is likely to depend on the relative speeds of training and running the algorithms, as well as on the performance of those algorithms. If frequent updates to the product data are needed, then a technique which is fast to train is likely to be more appropriate than one that may be fast to run but comparatively slow to train.

The product data on parts database 22 is encoded under equivalent conditions to those prevailing at the POS. The recognition step results in a list of candidates, and a results sorting step 52 then generates a product candidate list, which may be, say, a top-5 or top-15 list. Finally these candidates are passed to a display system 23 for appropriate display of a visual representation of the products in the candidate list to a checkout operator, the visual representation being a sample image of each product, a description and an associated barcode from parts database 12.

An additional parameter to enhance product discrimination and/or to speed up the recognition process is the item weight value, which data may be captured by means of weight data means 24 such as a scale associated with viewplate 10. The weight of an item is a physical attribute that can vary widely from product to product and therefore provide a very valuable recognition parameter, and minimise the error rate, in situations where size and shape may vary between some different items to a minimal extent. The weight data is passed to recognition stage 50 and used as part of the correlation data against weight data stored in product database 22 in generating the product candidate list. Clearly other physical parameters may additionally or alternatively be used in the appropriate circumstances to enhance the discrimination process, such as additional visual data (eg laser scanning or additional camera views from different angles), magnetic properties, acoustic characteristics, spectral fingerprint, etc.

If the system fails to match the item on the viewplate with any part from the product database (either because the part is not in the database or due to problems arising from placement, lighting or calibration), the operator can be given the option of cancelling the entire operation and reverting to a simple manual or on-screen product catalogue.

The item recognition system is embodied in a software programme on a PC or other local computer system, which may be linked to a centralised parts database 22, as part of a network of stations. Alternatively parts database 22 may be local to the checkout station and updated regularly by network download or by means of a CDROM.

Figure 6:
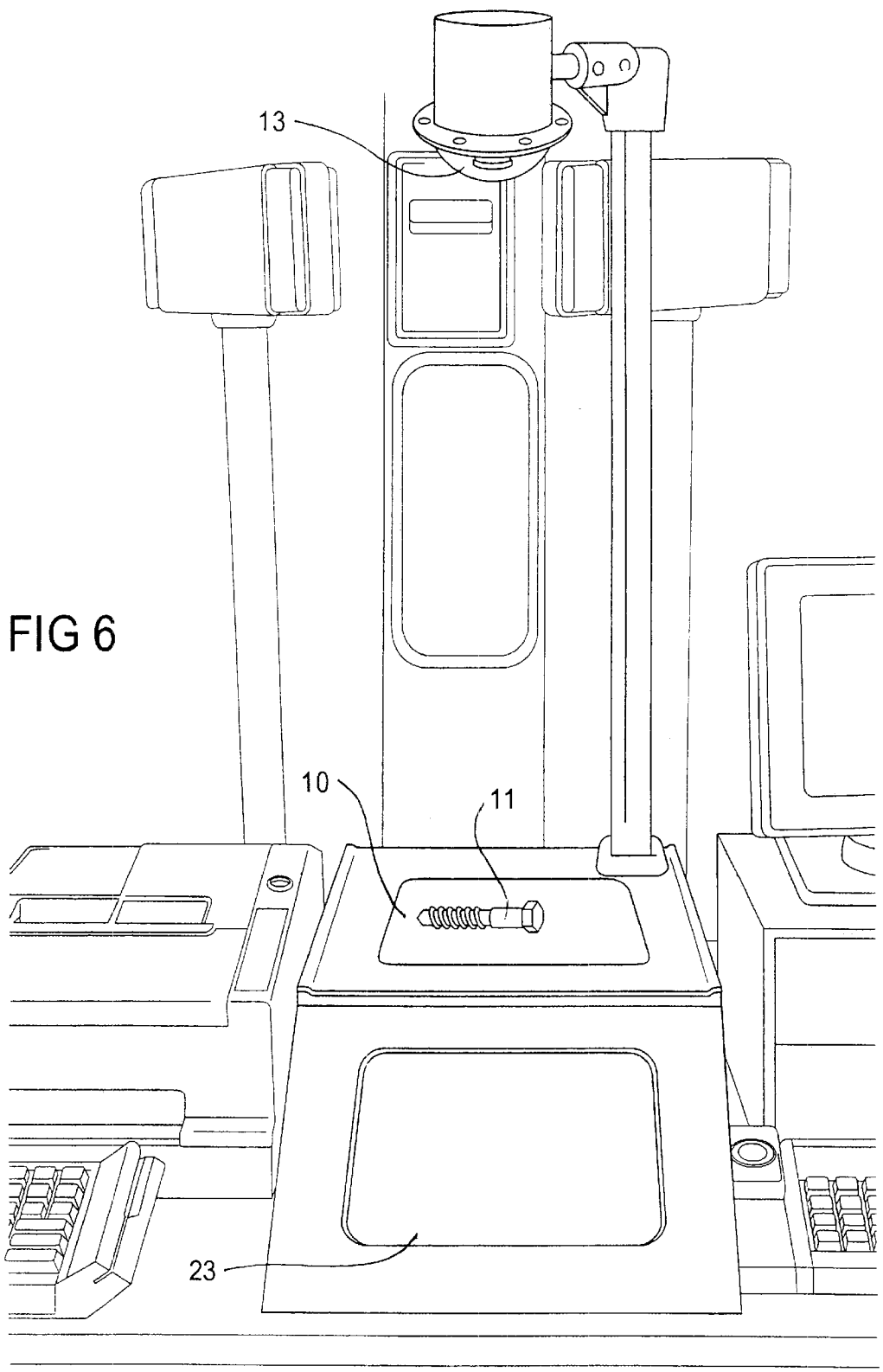
FIG. 6 is an overall view of the POS checkout station as seen by a checkout operator.

In use (see FIG. 6), the item 11 to be identified is placed on viewplate 10, which automatically triggers the image capture, processing, analysis and recognition steps as well as, if appropriate, a weight-value capture step. The resulting candidate list generated is then displayed on display 23. The customer or checkout operator then visually verifies the correct match presented from those displayed, and may have the operation of scrolling through pages of further candidates if the correct result is not found on the first page. The operator then uses a conventional hand-held checkout scanner to scan the associated barcode appearing on the display, or it may be preferred to circumvent the use of the barcode scanner by providing, say, a cursor- or touchscreen-operated selection system to allow the operator to enter the selected product directly on the display screen. The system may alternatively automatically send an identification to the computerised inventory/register system (such as the UPC number of a product) when the correlation between an item and a particular product profile stored on parts database 22 exceeds a certain "definite match" threshold. However it is thought that, since the checkout operator will be using a barcode scanner to enter other, larger items, for which the present invention might not be appropriate, then the use of screen barcodes will be more convenient and avoid undesirable interruption in the entry of a basket of diverse items. Furthermore there may be items of indeterminate topography without barcodes (such as cut lengths of rope in a hardware store) which will need individual attention and selection from an on-screen product catalogue by the checkout operator.

It has been found to be preferable in many situations to use an infra-red light source 12 (such as an array of IR-LEDs), detectable by camera 13, in order to minimise the effect of extraneous light sources on the image capture step. This is particularly the case when the objects to be recognised may be metallic, and therefore difficult to illuminate without introducing unwanted reflection.

In addition to the type of light source 12 employed, the light intensity emitted by the source has to be optimised. The selected source intensity is a factor of the viewplate properties and dimensions, the form of illumination used, the distance between the light source and viewplate, the camera lens filter used, as well as the sensitivity of the camera and image capture equipment. Ideally a small aperture is used for camera 13 in order to reduce the sensitivity to the effect of external light sources, and also to increase the depth of field, and therefore a higher intensity of illumination is generally preferred.

In a system tested (see below), an optimal distance between an IR-LED board and the viewplate, required for a clear and uniform background image, was found to be 8 cm.

In a form of the invention tested by the inventors, a touch-enabled colour 800×600 LCD panel (touchscreen) is used as display 23, for both viewing item 11, for displaying the resulting product candidate list, and for operator entry of system commands and product selection. The interface transition diagram of FIG. 7 diagrammatically illustrates the use of this panel, whilst the sample panel display shown in FIG. 8 shows a page of a resulting candidate list as well as the available operator commands.

A single item recognition apparatus is arranged to support two neighbouring cash registers, one on either side of the apparatus, and an operator can decide to which cash register a selected product identification (eg. a machine barcode) is sent by making a selection either on the right hand side or the left hand side of the display screen (see below).

Figure 7:
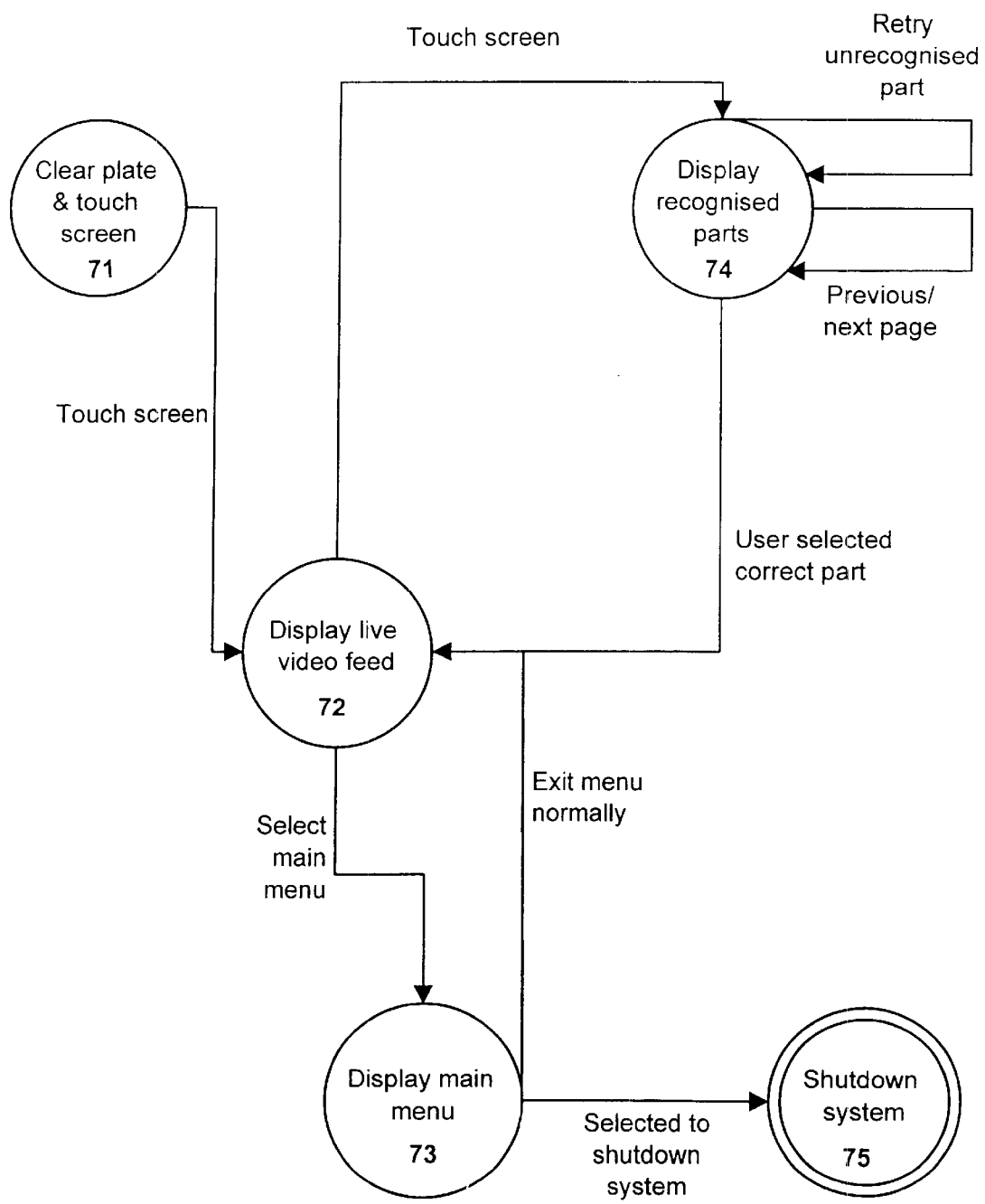
FIG. 7 shows a state transition diagram for an operator interface.
Figure 8:
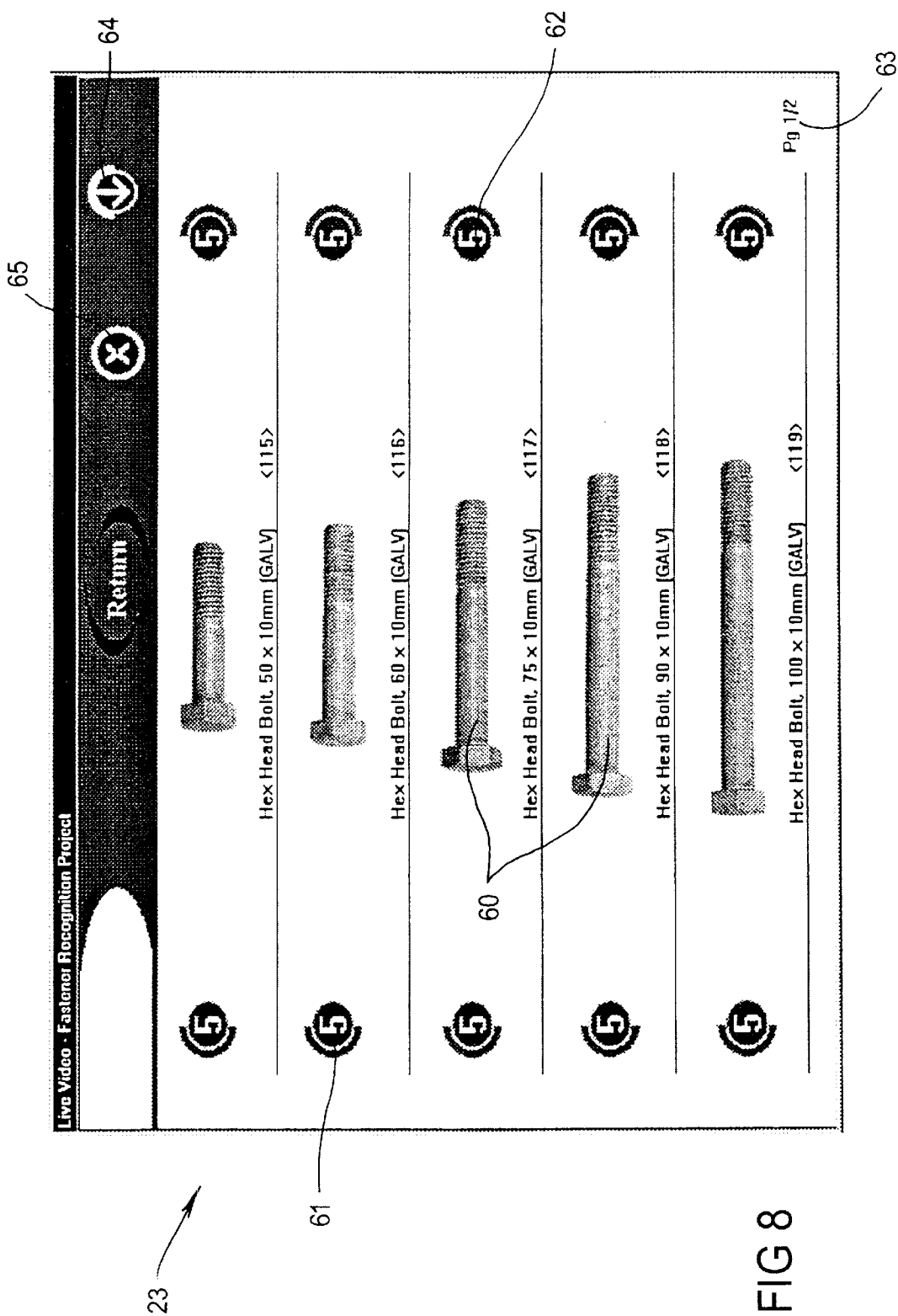
FIG. 8 shows an example view of the operator interface.

To begin use of the apparatus on a new item, the operator first clears viewplate 10 and touches screen 23 (step 71 in FIG. 7). This switches display 23 to provide a live video feed from camera 13 (step 72 in FIG. 7). The operator places item 11 to be identified on viewplate 10, ensuring the part is stationary and the image appears completely within the boundaries of the screen display. The operator then has the choice of selecting a MENU option by touching a part of the touchscreen (in which case a main menu is displayed (step 73 in FIG. 7) allowing the operator to choose further options or to shut down the system (step 75 in FIG. 7)), or to touch any other part of the image screen to begin the item recognition process.

After a short delay, the touchscreen display 23 then displays (step 74 in FIG. 7) a new screen (FIG. 8) including the product candidate list and selectable screen buttons. The candidates 60 are displayed as colour high-quality images together with a product description for each image, in descending order of likelihood in accordance with the result of applying the computer pattern recognition algorithm. If the correct result is not found on the first page, the operator may press button 64 to scroll forward through further pages, the page number being displayed in a corner of the screen 63. On the final page a CATALOGUE button will be available, enabling the operator to switch to a catalogue display if the correct product does not appear amongst candidates 60. If the system fails to match item 11 for any reason, the operator can press CANCEL button 65 to cancel the operation and try again, or alternatively switch to the CATALOGUE option.

When the operator successfully locates the correct product from candidates 60, the desired selection is made by pressing on the appropriate button 61 or 62, depending on whether the selection is made for an entry in the right hand register or the left hand cash register. Once the selection is made, item 11 is then removed from viewplate and touchscreen 23 is touched once more to return to the live video feed signal display.

It is to be noted that the system may be set up to recognise multiple items placed on viewplate 10, by applying the analysis and recognition steps to each of a number of segmented images identified from a single captured image.

It is understood that various modifications, alterations and/or additions may be made to the embodiments specifically described and illustrated herein without departing from the spirit and scope of the invention.

What is claimed is:

1. A method for recognising an individual item at an identification station from a variety of known products for purposes of entry into an inventory and/or register system, said method comprising the steps of;

providing a viewplate at said identification station;

illuminating said viewplate from the backside to provide a backlit image viewable from the front side of the viewplate;

providing a digital image capturing means positioned relative to the viewplate to capture said backlit image;

capturing and storing a reference image of said viewplate;

supporting the item to be identified adjacent the viewplate;

viewing said item with said digital image capturing means to capture said backlit image;

providing a digitised image signal representing said captured image;

processing said digitised image signal by subtraction of a representation of said stored reference image to remove viewplate artifact, to provide a background-compensated image signal;

image-analysing said background-compensated image signal to generate at least one image descriptor characterising features of size and/or shape of the item to be identified;

providing a computerised product database for storage of data sets representing image descriptors characterising features of size and/or shape for all of said variety of known products;

comparing said at least one item image descriptor with the data stored on said computerised product database to identify data sets with the highest correlation;

displaying a recognition result, being a visual representation of at least one product corresponding to the data sets with the highest correlation; and providing means for selective verification whereby an operator can confirm the recognition result for entry into the inventory and/or register system.

2. A method according to claim 1, wherein said digital image capturing means is a black-and-white digital camera and said digitised image signal is a grey-scale image signal.

3. A method according to claim 1, wherein said identification station is a checkout counter in a retail goods outlet, provided with a display screen for displaying said recognition result.

4. A method according to claim 1, wherein said viewplate is associated with a weight data means capturing weight data of said item to be identified, and said weight data is also used in said computerised product database and said comparison step to produce the recognition result.

5. A method according to claim 1, wherein said digitised image signal or said background compensated image signal is subjected to a binary threshold step.

6. A method according to claim 1, wherein said background compensated image signal is subjected to a filtering step to reduce or remove noise and/or errors.

7. A method according to claim 1, wherein said image analysing step includes an object segmentation step which serves to isolate a segmented image of an individual item from any other parts of the image.

8. A method according to claim 7, wherein the object segmentation step involves a selection based on prescribed criteria of size, shape and/or position to select a segmented image of an individual item from other segmented images.

9. A method according to claim 1, wherein said generation of said at least one image descriptor involves calculating a representation of at least one parameter of said background-compensated image signal selected from the group of:

width;
   length;
   area;
   occupation ratio;
   circularity;
   perimeter;
   eccentricity;
   hole number;
   hole size;
   boundary feature;
   radial diameters signature;
   minimum radial diameters;
   maximum radial diameters;
   mean of radial diameters;
   standard deviation of radial diameters;
   radial radii signature;
   minimum radial radii;
   maximum radial radii;
   mean of radial radii;
   standard deviation of radial radii;
   first Hu moment;
   second Hu moment;
   third Hu moment;
   fourth Hu moment;
   fifth Hu moment;
   sixth Hu moment; and
   seventh Hu moment.

10. A method according to claim 1, wherein said comparison step involves a pattern recognition algorithm.

11. A method according to claim 10, wherein the pattern recognition algorithm involves a K-Nearest Neighbour technique.

12. A method according to claim 1, wherein said recognition result is a candidate list of a number of said products with the data sets having the highest ranking correlation.

13. A method according to claim 1, wherein the visual representation includes an image of a product or products stored on said computerised product database.

14. A method according to claim 1, wherein the display step includes the display on a touchscreen for product selection by the operator.

15. A method according to claim 1, wherein said capturing and storing of the reference image is repeated at intervals.

16. An item recognition apparatus for recognising an individual item from a variety of known products for purposes of entry into an inventory and/or register system, said apparatus comprising:

an identification station having:
a viewplate with backside illumination to provide a backlit image viewable from the frontside of the viewplate;
a digital image capture means arranged to view said backlit image;
a display screen for viewing by an operator; and
an entry means for the operator to selectively make entries into the inventory and/or register system;
computer storage and processing means having:
a first memory store containing data representing a reference image of said viewplate;
a second memory store containing a product database of data sets representing image descriptors characterising features of size and/or shape for all of said variety of known products; and
digitised image processing and analysing means for processing and analysing a digitised image captured by said digital image capture means, including:
means for using the data in said first memory store to subtract the representation of said reference image;
means for generating at least one image descriptor characterising features of size and/or shape of the item to be identified; and
means for comparing said at least one image descriptor with said stored data in said second memory store to identify stored data sets with the highest correlation and to produce a recognition result;
and means for communicating said recognition result to said display screen.

17. An apparatus according to claim 16, wherein said entry means includes a touchscreen.

18. An apparatus according to claim 17, including a plurality of identification stations, the computer storage and processing means having a first memory store associated with each identification station and a central second memory store for communication with each of the plurality of identification stations.

19. An apparatus according to claim 17, wherein said identification station includes a weighscale associated with said viewplate, said product database including data characterising the weight of all of said variety of known products, and said comparison means including means to compare weight data from an item with stored weight data in the product database.

20. A checkout station in a retail goods outlet incorporating an item recognition apparatus according to claim 17.

21. A system including the item recognition apparatus of claim 17 in combination with an inventory and/or register system.

* * * * *